United States Patent
Masaki et al.

(10) Patent No.: US 8,371,406 B2
(45) Date of Patent: Feb. 12, 2013

(54) FUEL CELL STACK MOUNTING STRUCTURE AND FUEL CELL STACK MOUNTING METHOD

(75) Inventors: Daisuke Masaki, Kariya (JP); Koji Katano, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/144,069

(22) PCT Filed: Jul. 6, 2010

(86) PCT No.: PCT/JP2010/004406
§ 371 (c)(1),
(2), (4) Date: Jul. 11, 2011

(87) PCT Pub. No.: WO2012/004828
PCT Pub. Date: Jan. 12, 2012

(65) Prior Publication Data
US 2012/0006606 A1 Jan. 12, 2012

(51) Int. Cl.
*B60K 1/00* (2006.01)
(52) U.S. Cl. ............... 180/65.31; 180/68.4; 180/299
(58) Field of Classification Search ............... 180/65.31, 180/65.1, 68.4, 68.5, 232, 299; 429/437, 429/458
See application file for complete search history.

(56) References Cited

U.S. PATENT DOCUMENTS

| | | | | |
|---|---|---|---|---|
| 5,662,184 A | * | 9/1997 | Riemer et al. | 180/65.1 |
| 6,223,843 B1 | * | 5/2001 | O'Connell et al. | 180/65.22 |
| 6,443,253 B1 | * | 9/2002 | Whitehead et al. | 180/68.1 |
| 6,494,286 B2 | * | 12/2002 | Shimizu et al. | 180/299 |
| 6,994,178 B2 | * | 2/2006 | Mizuno | 429/430 |
| 7,114,586 B2 | * | 10/2006 | Uozumi | 180/68.1 |
| 7,144,039 B2 | * | 12/2006 | Kawasaki et al. | 280/784 |
| 7,255,945 B2 | * | 8/2007 | Enjoji et al. | 429/437 |
| 7,726,429 B2 | * | 6/2010 | Suzuki | 180/232 |
| 7,913,784 B2 | * | 3/2011 | Horii et al. | 180/65.31 |
| 8,016,062 B2 | * | 9/2011 | Jufuku | 180/65.31 |
| 2003/0108784 A1 | * | 6/2003 | Enjoji et al. | 429/34 |
| 2003/0148168 A1 | * | 8/2003 | Enjoji et al. | 429/38 |
| 2010/0183949 A1 | * | 7/2010 | Niimi | 429/508 |

FOREIGN PATENT DOCUMENTS

| | | |
|---|---|---|
| JP | 2002-373691 A | 12/2002 |
| JP | 2003-173790 A | 6/2003 |
| JP | 2005-130545 A | 5/2005 |
| JP | 2006-155981 A | 6/2006 |

(Continued)

OTHER PUBLICATIONS

International Search Report issued Oct. 5, 2010 in PCT/JP2010/004406.

*Primary Examiner* — Katy M Ebner
*Assistant Examiner* — Emma K Frick
(74) *Attorney, Agent, or Firm* — Kenyon & Kenyon LLP

(57) ABSTRACT

The fuel cell stack is placed in an attitude for which the stacking direction of the plurality of cells are tilted in relation to the front-back direction of the vehicle, and the second end plate is positioned at forward and upper position relative to the first end plate in the vehicle. The radiator is provided at a forward position relative to the second end plate, and along the second end plate. The first compressor is fixed at a total of three or more points to both the first and second end plates below the fuel cell stack.

3 Claims, 4 Drawing Sheets

FOREIGN PATENT DOCUMENTS

| | | |
|---|---|---|
| JP | 2006-218966 A | 8/2006 |
| JP | 2007-107478 A | 4/2007 |
| JP | 2007-157364 A | 6/2007 |
| JP | 2007-245954 A | 9/2007 |
| JP | 2009-184589 A | 8/2009 |
| JP | 2009-295482 A | 12/2009 |

* cited by examiner

FUEL CELL STACK MOUNTING STRUCTURE AND FUEL CELL STACK MOUNTING METHOD

TECHNICAL FIELD

The present invention relates to a fuel cell stack mounting method.

BACKGROUND ART

Vehicles in which a fuel cell is mounted have been proposed in the past. For example, with certain technologies, the fuel cell is placed inside the engine compartment such that the stacking direction of the plurality of cells of the fuel cell matches the vehicle vertical direction. Also, a radiator for radiating heat absorbed by the cooling water inside the fuel cell to the outside is installed inside the engine compartment, in front of the fuel cell, and along the vertical direction of the vehicle. Also, an oxidation gas compression device for compressing the oxidation gas supplied to the fuel cell is attached to the vehicle body separately from the fuel cell at the rear side of the fuel cell.

DISCLOSURE OF THE INVENTION

Problem the Invention Attempts to Solve

However, with the prior art noted above, due to restrictions in the vehicle lowest height above ground and the vehicle overall size, it is not possible to increase the number of fuel cell cells within an engine compartment with limited height. Because of this, it is difficult to mount a high output fuel cell into a vehicle. It is also difficult to make the radiator area large in a similarly height-limited engine compartment. Because of this, it is difficult to mount a high cooling capacity radiator in a vehicle. Furthermore, with the prior art noted above, for example in a case such as when the vehicle collides with an object or the like, there was no consideration of the point that the fuel cell stacking structure could possibly twist with the stacking direction as the axis.

This kind of problem exists widely for fuel cell mounting structures for which it is preferable to make the overall size smaller, and for which it is desirable to mount a high output, high rigidity fuel cell and a high cooling capacity cooling device.

The present invention is addressed to attaining the above at least in part, and an object is to mount a fuel cell with a large stack count and high torsional rigidity as well as a radiator with a large heat radiating area into a limited space for a fuel cell mounting structure.

SUMMARY OF INVENTION

The present invention can be realized according to the following modes or application examples to address the problems described above at least in part.

[First Aspect]

A structure for mounting a fuel cell in a vehicle, comprising a fuel cell stack having a plurality of stacked cells, and a first and second end plate placed at both ends in stacking direction of the plurality of cells, a first compressor for supplying oxidation gas to the fuel cell stack, and a flat plate shaped heat radiator for cooling a cooling medium that circulates inside the fuel cell stack, wherein the fuel cell stack is provided in an attitude in which the stacking direction of the plurality of cells is tilted relative to a front-back direction of the vehicle, and the second end plate is provided at forward and upper position relative to the first end plate in the vehicle, the heat radiator is provided at a forward position relative to the second end plate and along the second end plate in the vehicle, and the first compressor is fixed at total of three or more points to both the first and second end plates below the fuel cell stack.

In such an aspect, the stacking direction of the fuel cell stack cell is at a slant. Accordingly, the number of cell layers of the fuel cell stack is not directly limited by the height of the engine compartment. Also, the first compressor is fixed at a total of three or more points to both the first and second end plates. Accordingly, the torsional rigidity of the fuel cell stack is increased. Also, the heat radiator is placed at a slant along the second end plate. Accordingly, the area of the heat radiator is not directly limited by the height of the engine compartment. Thus, with the kind of aspect noted above, it is possible to mount a fuel cell with a large number of layers and with high torsional rigidity as well as a radiator with a large heat radiating surface in a limited space.

Note that the tilt of the cell stacking direction in relation to the front-back direction of the vehicle is preferably less than 90 degrees, more preferably 75 degrees or less, and even more preferably 60 degrees or less.

Also, it is possible to have the first compressor fixed by one point to the first end plate, and fixed by two or more points to the second end plate. Also, the first compressor can be fixed by two or more points to the first end plate, and by one point to the second end plate.

Furthermore, the first compressor can be fixed by two or more points to the first end plate, and fixed by two or more points to the second end plate. With such a mode, it is possible to further increase the torsional rigidity of the fuel cell stack.

[Second Aspect]

A structure according to the first aspect, further comprising a second compressor for adjusting a temperature in an interior of the vehicle, wherein a vertical dimension of the second compressor is smaller than those of the first compressor, and the second compressor is provided below the fuel cell stack, and at a rear position relative to the first compressor.

With such an aspect, the larger first compressor is placed in the front in the space below the fuel cell stack that is placed at a tilt, and the second compressor that is smaller than the first compressor is place at the rear. Because of this, it is possible to make effective use of the space below the fuel cell stack that is placed at a tilt, and to place two compressors without making the overall structure larger.

Note that the second compressor can be fixed to the fuel cell stack, and can also be fixed to the first compressor. It is also possible to fix it to another structure. Specifically, the second compressor can be fixed at the positions described above regardless of the other item being fixed.

[Third Aspect]

A structure according to the first or second aspect, further comprising a waterproof case for covering at least one of the first and second end plates, wherein the waterproof case comprises:

a hole in which a fixing member passes through, the fixing member fixing mutually the first compressor and the end plate covered by the waterproof case, and a protruding portion that surrounds the hole, has elasticity, and protrudes to a side of the end plate covered by the waterproof case or a side of the first compressor, wherein in a state in which the end plate covered by the waterproof case and the first compressor are fixed by the fixing member, a tip of the protruding portion is in contact with the end plate or the first compressor.

With such an aspect, it is possible by the waterproof case to prevent the situation of water that penetrates from outside reaching the end plate. Also, with the aspect noted above, the protruding portion surrounds the hole for being passed through by the fixing member that fixes the end plate and the first compressor, and the tip of the protruding portion contacts the end plate or the first compressor. Because of this, there is a low possibility of water passing through that hole and entering to the end plate.

[Fourth Aspect]

4. A method of mounting a fuel cell in a vehicle, comprising (a) preparing a fuel cell stack having a plurality of stacked cells and a first and second end plate placed at both ends in stacking direction of the plurality of cells, a first compressor for supplying oxidation gas to the fuel cell stack, and a flat plane shaped heat radiator for cooling a cooling medium that circulates inside the fuel cell stack, and (b) attaching the fuel cell stack, the first compressor, and the heat radiator to the vehicle such that the fuel cell stack is provided in an attitude in which the stacking direction of the plurality of cells is tilted relative to a front-back direction of the vehicle, and the second end plate is provided at forward and upper position relative to the first end plate in the vehicle, the heat radiator is provided at a forward position relative to the second end plate and along the second end plate in the vehicle, and the first compressor is fixed at total of three or more points to both the first and second end plates below the fuel cell stack, wherein the step (a) comprises:

preparing the first and second end plates respectively having one straight line side in at least a portion, aligning the plurality of cells and the first and second end plates in a stacking sequence, while placing the first and second end plates on a same plane in an orientation in which each of the straight line sides is at a bottom, and joining the plurality of cells and the first and second end plates to constitute the fuel cell stack, and the step (b) comprises supporting the fuel cell stack at a different side from the one side, and fixing the first compressor to the first and second end plates so as to be in contact with each of the one sides.

With such an aspect, the first compressor is fixed to the first and second end plates in contact with the one straight line side of the first end plate and the one straight line side of the second end plate. Because of this, when fixing the first compressor to the first and second end plates, it is difficult for three dimensional positional displacement to occur.

The present invention can be realized in various aspects other than those noted above, and can be realized, for example, in aspects such as a fuel cell mounting method, a fuel cell system, a vehicle in which a fuel cell is mounted, and the like.

Following, a detailed description of preferred embodiments of the invention of this application is provided while referring to the drawings, and clarifying the objects of the invention of this application described above, other objects, the constitution, and effects.

BEST MODE FOR CARRYING OUT THE INVENTION

A. First Embodiment

Figure 1:
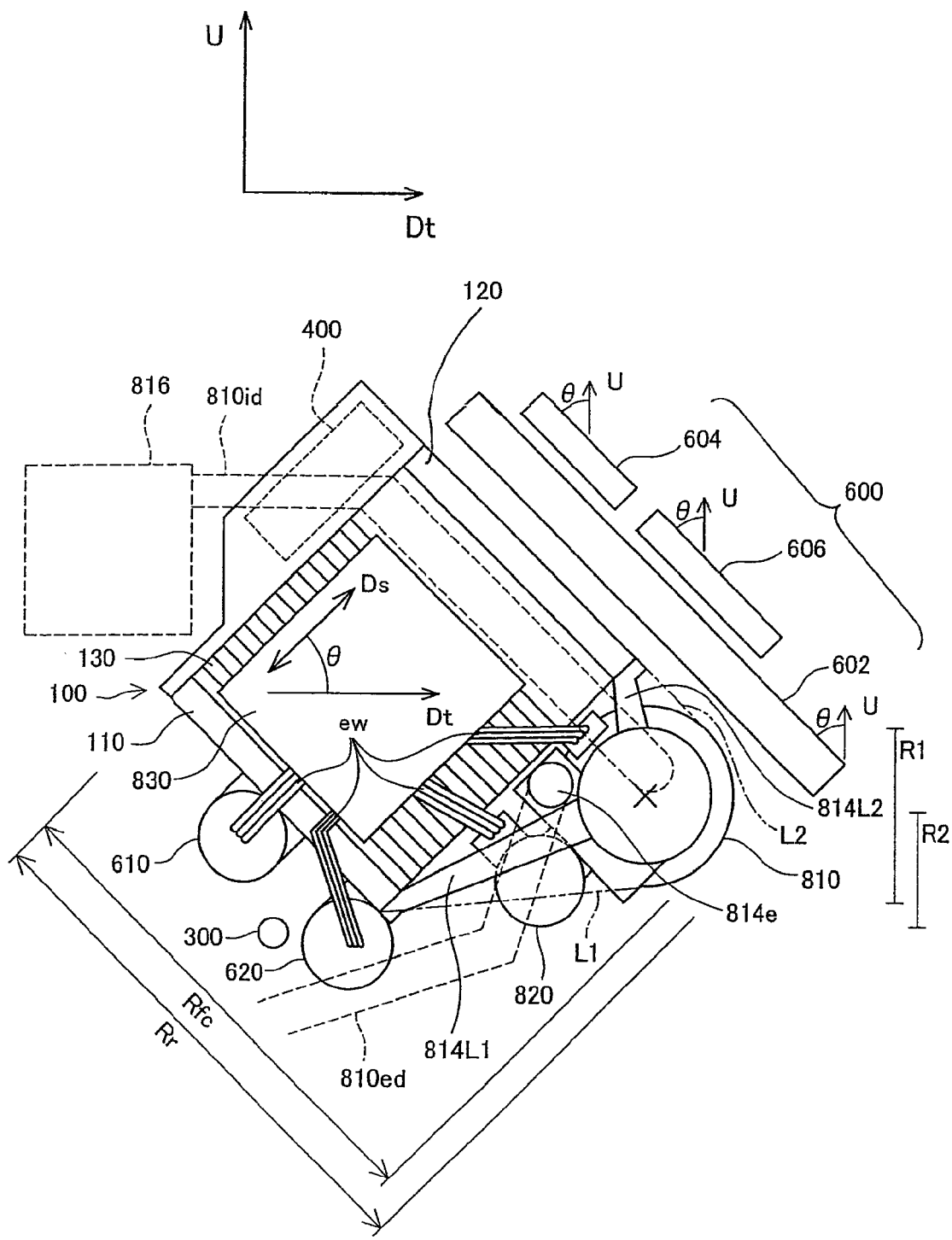
FIG. 1 is a schematic diagram showing the constitution for attaching a drive system equipped with a fuel cell to a vehicle.

FIG. 1 is a schematic diagram showing the structure for attaching a drive system equipped with a fuel cell to a vehicle. This drive system is equipped with a fuel cell stack 100, a motor unit 200 (not shown in FIG. 1), a drive shaft 300, a control circuit unit 400, a radiator 600, a hydrogen pump 610, a cooling fluid pump 620, air compressors 810 and 820, and an inverter unit 830. Note that in FIG. 1, the vehicle travelling direction, specifically, the front-back direction, is shown by arrow Dt, and vertically upward is shown by arrow U.

The fuel cell stack 100 is equipped with first and second end plates 110 and 120 placed at both ends, and a plurality of power generating cells 130 placed between those end plates 110 and 120. The end plates 110 and 120 are generally plate shaped members made of stainless steel. However, structures for attaching various members are provided at the outside surfaces of the end plates 110 and 120 (the left side surface of the end plate 110 and the right side surface of the end plate 120). In FIG. 1, to make the technology easy to understand, an illustration of those structures is omitted.

The plurality of power generating cells 130 are stacked along the linking direction of the first end plate 110 and the second end plate 120. The first end plate 110 and the second end plate 120 are fastened by a fastening member (not shown in FIG. 1). As a result, the plurality of power generating cells 130 are compressed by the first end plate 110 and the second end plate 120. Note that the external shape of the plurality of power generating cells 130 when projected in relation to the stacking direction Ds of the power generating cells 130 is generally the same. Also, the external shape of the first end plate 110 and the second end plate 120 when projected in relation to the stacking direction Ds of the power generating cells 130 is generally the same. With this embodiment, the external shape of the power generating cells 130 and the first end plate 110 and the second end plate 120 when projected in relation to the stacking direction Ds of the power generating cells 130 is generally rectangular.

As a result of the power generating cells 130, the first end plate 110, and the second end plate 120 respectively being provided in a rectangular shape, the fuel cell stack 100 has an overall generally rectangular solid shape. The fuel cell stack 100 is covered by a generally rectangular solid waterproof case 140 made of resin. However, in FIG. 1, to make the technology easy to understand, an illustration of the waterproof case 140 is omitted.

The air compressor 810 is attached to the surface (the lower right side surface in FIG. 1) correlating to one side of the rectangular cross section of the first end plate 110 and the second end plate 120. The air compressor 810 takes in air via an air cleaner 816 and a duct 810*id*, and is a compressor for supplying compressed air as the oxidation gas to the fuel cell stack 100. Note that in FIG. 1, to make the technology easy to understand, the air cleaner 816 and the duct 810*id* are shown by dotted lines.

The air compressor 810 is fixed at two points of the bottom end surface of the second end plate 120 via leg parts 812L and 814L2 of the air compressor 810. Also, the air compressor 810 is fixed at one point of the bottom end surface of the first end plate 110 via the leg part 814L1 of the air compressor 810.

Figure 2:
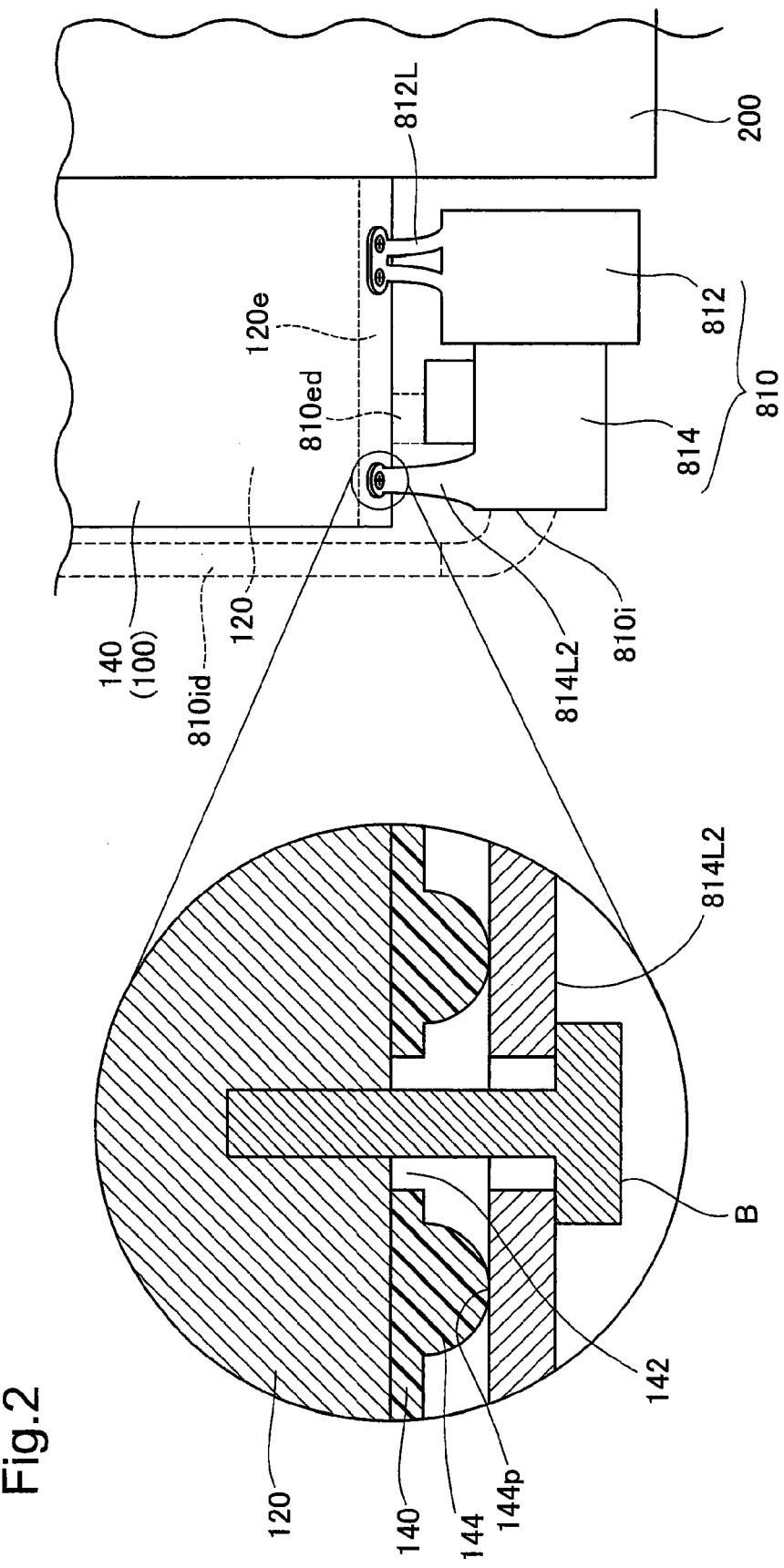
FIG. 2 is a drawing viewing the fuel cell stack 100, the motor unit 200, and the air compressor 810 in a direction facing the rear from the front of the vehicle.

FIG. 2 is a drawing viewing the fuel cell stack 100, the motor unit 200, and the air compressor 810 in an orientation facing the rear from the front of the vehicle. Note that the fuel cell stack 100 has its exterior covered by the waterproof case 140. In FIG. 2, the corner of end surface 120*e* of the second end plate 120 of the fuel cell stack 100 is shown by a dotted line.

Note that at the front of the fuel cell stack 100, the motor unit 200, and the air compressor 810 (the front side of FIG. 2) there is a radiator 600 (see FIG. 1). However, in FIG. 2, to make the technology easy to understand, this is shown with the radiator 600 removed.

The air compressor 810 has a motor part 812 driven by the power supplied from the fuel cell stack 100, and a compression part 814 for compressing air driven by the motor. The motor part 812 has a generally round cylindrical external shape, and the compression part 814 has a generally round cylindrical external shape for which the circular end surface diameter is smaller than that of the motor part 812. As a result, the air compressor 810 has an external shape that has the two round cylinders stacked each other with the same center axis. The air compressor 810 is attached to the fuel cell stack 100 in an attitude in which its cylinder axis is perpendicular to the stacking direction Ds of the fuel cell stack 100 cells 130, and parallel to the bottom surface of the fuel cell stack 100.

The motor part 812 of the air compressor 810 emits heat. Because of this, a cooling water flow path is provided on the outer shell of the motor part 812. The motor part 812 is cooled by this cooling water. The motor part 812 and the end surface of the second end plate 120 are joined by a bolt via the leg part 812L. Because of this, the heat of the second end plate 120 is conducted to the outer shell of the motor part 812. As a result, the second end plate 120 is also cooled by the cooling water that flows through the outer shell of the motor part 812.

Also, the compression part 814 of the air compressor 810 and the end surface of the second end plate 120 are joined by a bolt via the leg part 814L2. Furthermore, though not shown in FIG. 2, the compression part 814 of the air compressor 810 and the end surface of the first end plate 110 are also joined by a bolt via the leg part 814L1 (see FIG. 1). Specifically, the air compressor 810, the first end plate 110, and the second end plate 120 are joined at a total of three points.

The air compressor 810 is fixed by bolts at three location sites to the fuel cell stack 100. Because of this, the air compressor 810 and the fuel cell stack 100 are not relatively displaced easily even when external force is applied. Specifically, the air compressor 810 and the fuel cell stack 100 are substantially integrally displaced. Because of this, it is not necessary to provide a space between the air compressor 810 and the fuel cell stack 100 for avoiding collisions between the two items when both items are relatively displaced. Thus, it is possible to place the air compressor 810 and the fuel cell stack 100 near each other, and as a result, it is possible to make the overall space occupied by the air compressor 810 and the fuel cell stack 100 smaller.

Also, as shown in FIG. 1, the air compressor 810 is fixed to the fuel cell stack 100 in an attitude for which a discharge port 814*e* for discharging air from the compression part 814 is positioned at the fuel cell stack 100 side in relation to the cylinder of the compression part 814. In more detail, the discharge port 814*e* is placed within the space surrounded by the straight line L1 that contacts the circle of the cross section of the air compressor 810 (motor part 812) and reaches the end of the first end plate 110, the straight line L2 that that contacts the circle of the cross section of the air compressor 810 (motor part 812) and reaches the end of the second end plate 120, the fuel cell stack 100, and the air compressor 810. As a result, the discharge port 814*e* is positioned between the fuel cell stack 100 and the cylinder parts of the air compressor 810 respectively having a strong structure.

By using this kind of structure, when the structure in FIG. 1 receives impact from outside, it is possible to reduce the possibility of the discharge port 814*e* being crushed. Also, by placing the duct 810*ed* for supplying compressed air to the fuel cell stack 100 facing the rear from the discharge port 814*e* placed at the kind of position noted above (see FIG. 1), it is possible to avoid the situation of the duct 810*ed* for supplying compressed air to the fuel cell stack 100 inhibiting air that passes through the radiator 600 positioned at the front. Note that in FIG. 1 and FIG. 2, the duct 810*ed* is shown by a dotted line to make the technology easy to understand.

Furthermore, the first end plate 110 and the second end plate 120 of the fuel cell stack 100 are joined to each other at three points via the air compressor 810. Because of this, even when external force is applied to the fuel cell stack 100 by a vehicle collision or the like, the fuel cell stack 100 has the stacking direction Ds as the axis, and has a low possibility of twisting.

Note that as shown in FIG. 2, an air inlet 810*i* for introducing outside air to the air compressor 810 is connected to the end surface of the cylinder of the compression part 814. Also, the duct 810*id* that connects the air cleaner 816 and the air inlet 810*i* is provided at the opposite side of the motor unit 200 in relation to the air compressor 810. With this kind of structure, it is possible to place the duct 810*id* without interfering with the motor unit 200. Note that in FIG. 1 and FIG. 2, the duct 810*id* is shown by a dotted line to make the technology easy to understand.

An enlarged cross section view of the fixing structure of the leg part 814L2 and the second end plate 120 is shown at the left side of FIG. 2. The end plate 120 is covered by the waterproof case 140 provided with resin having elasticity. This waterproof case 140 is equipped with a hole 142. The hole 142 is a hole for the passing through the bolt B that fixes the leg part 814L2 provided on the compression part 814 and the second end plate 120. With the waterproof case 140, a ring-shaped protruding portion 144 that protrudes facing the compression part 814 (leg part 814L2) is provided around the hole 142 so as to surround the hole 142.

The tip portion 144*p* of the protruding portion 144 (bottom edge part in FIG. 2) contacts the leg part 814L2 of the compression part 814. Also, the protruding portion 144 is compressed between the second end plate 120 and the leg part 814 and is elastically deformed. As a result, the end part of the protruding portion 144 is adhered to the leg part 814L2.

By using this kind of structure, it is possible to rigidly join the second end plate 120 covered by the waterproof case 140 and the compression part 814 using the bolt B that passes through the hole 142 of the waterproof case 140. Also, because the ring-shaped protruding portion 144 that surrounds the hole 142 is adhered to the leg part 814L2 of the compression part 814, there is a low possibility of water entering from outside into the waterproof case 140 (second end plate 120 side) through the hole 142.

Note that here, we described an example with the leg 814L2 and the second end plate 120 joined, but the same structure is used for the joining part of the leg part 812L and the second end plate 120 (see FIG. 2), and the joining part of the leg part 814L1 and the first end plate 110 (see FIG. 1). Because of this, it is possible to rigidly join the air compressor 810 to the fuel cell stack 100, and in fact, it is possible to reduce the possibility of water entering from outside into the waterproof case 140. Note that in the example of FIG. 2, the joined part of the leg part 812L provided on the motor part 812 and the second end plate 120 is joined with two bolts.

Meanwhile, though not illustrated, the motor unit 200 is fixed by bolts at three location sites to the first end plate 110. Because of this, the motor unit 200 and the first end plate 110 are not easily relatively displaced even when external force is applied. Specifically, the motor unit 200 and the first end plate 110 are substantially integrally displaced. Also, the motor unit 200 is fixed by bolts at three location sites to the second end plate 120. Because of this, the motor unit 200 and the second end plate 120 are not easily relatively displaced even when external force is applied. Specifically, the motor unit 200 and the second end plate 120 are substantially integrally displaced.

The motor unit 200 is equipped with a drive motor 210 and a transmission 220 within its outer shell. The drive motor 210 is driven by the power generated by the fuel cell stack 100. The transmission 220 reduces the rotation count per unit of time for rotation output by the drive motor 210. The output shaft of the transmission 220 is connected to the drive shaft 300 (see FIG. 1). Specifically, the drive shaft 300 is rotated by the drive motor 210 via the transmission 220.

The control circuit unit 400 shown in FIG. 1 controls the voltage and current of the power generated by the fuel cell stack 100. The control circuit unit 400 is placed along the stacking direction Ds of the plurality of power generating cells 130 on the top part of the fuel cell stack 100. The control circuit unit 400 is placed at a position closer to the second end plate 120 than the first end plate 110. The control circuit unit 400 is fixed to the fuel cell stack 100.

Figure 3:
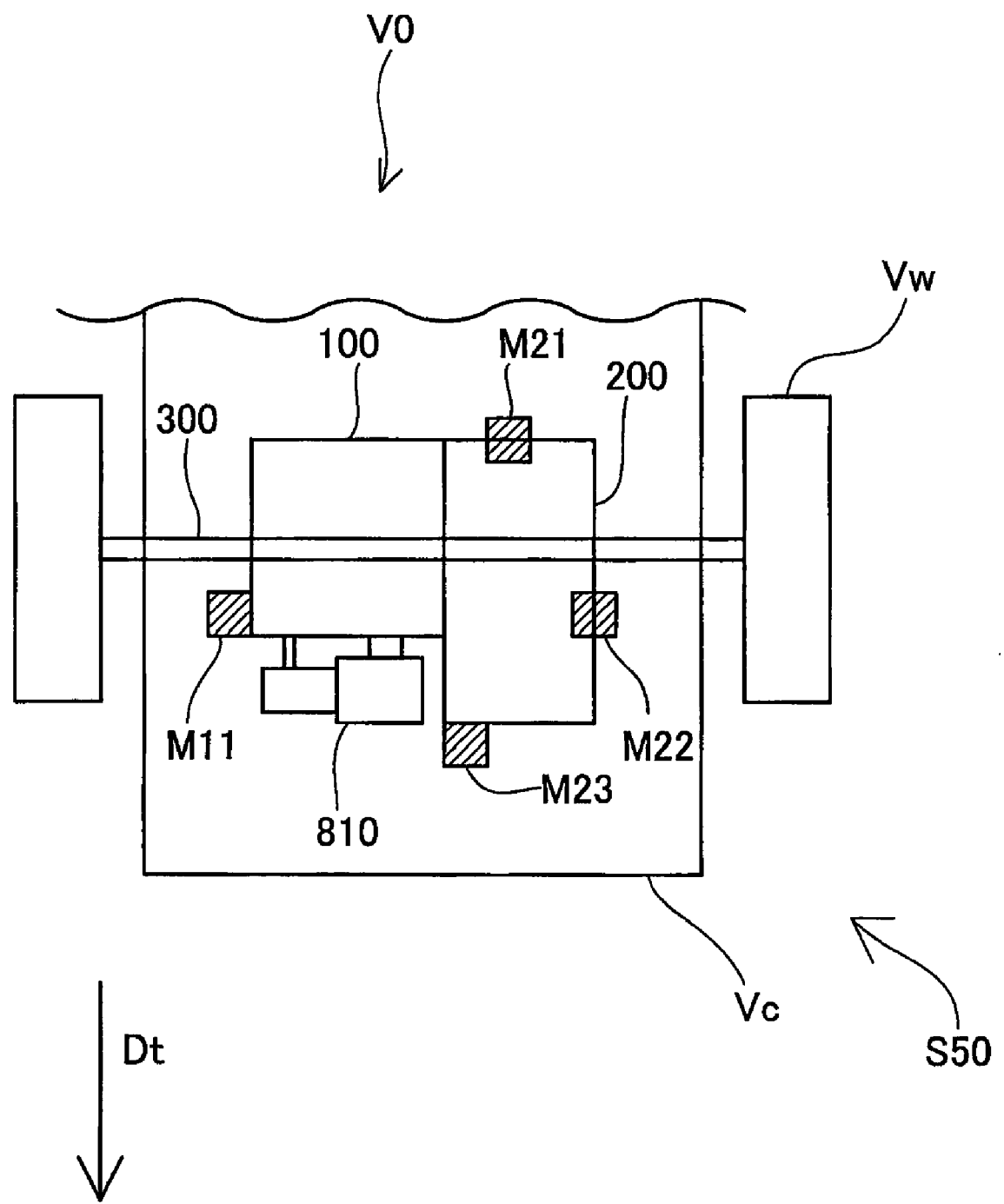
FIG. 3 is a plan view typically showing the locations at which the fuel cell stack 100 and the motor unit 200 are attached to the chassis Vc of the vehicle V0.

FIG. 3 is a plan view typically showing the locations at which the fuel cell stack 100 and the motor unit 200 are attached to the chassis Vc of the vehicle V0. In FIG. 3, in addition to part of the structure shown in FIG. 1, the chassis Vc and a wheel Vw of the vehicle V0 are shown. The fuel cell stack 100 and the motor unit 200 are fixed to the chassis Vc of the vehicle V0. More specifically, the first end plate 100 of the fuel cell stack 100 is connected to one mount M11 provided on the chassis Vc of the vehicle V0. The motor unit 200 is connected to three mounts M21, M22, and M23 provided on the chassis Vc.

Note that the position of these mounts on the chassis are common with the mounts on the chassis of a hybrid vehicle that runs by a gasoline engine and motor. With the hybrid vehicle, the mount M11 supports the gasoline engine. Mounts M21, M22, and M23 support the motor unit in the same way as this embodiment. Note that to make the technology easy to understand, each mount is not represented in FIG. 1.

As shown in FIG. 1, in a state when the vehicle is not loaded with people or baggage and is on a horizontal plane, the fuel cell stack 100 is fixed on the vehicle body in an attitude with the stacking direction Ds of the plurality of power generating cells 130 tilted by θ in relation to the horizontal plane (where the angle θ is 0<θ<90) (see FIG. 1). Note that the stacking direction Ds is a direction contained within the plane defined by the vehicle's front-back direction Dt and vertical direction U. As a result, the first end plate 110 is positioned at a position lower than the second end plate 120 in that state. Also, the first end plate 110 is positioned further to the rear in the vehicle travelling direction than the second end plate 120.

Note that the external shape of the first end plate 110 and the second end plate 120 when projected in relation to the stacking direction Ds of the power generating cells 130 is generally the same. The positions of the first end plate 110 and the second end plate 120 are determined with (i) the centroid of the range for which the external shape of the first end plate 110 and the second end plate 120 overlap when projected in relation to the stacking direction Ds of the power generating cells 130, and (ii) the center positions of the thickness direction of the plate shaped part of each end plate, as the references.

With this kind of structure, the stacking direction Ds of the cells 130 of fuel cell stack 100 is not a vertical direction U but rather at a slant, so the number of cell layers of cells 130 of the fuel cell stack 100 is not directly limited by the height of the engine compartment. Because of this, compared to a mode for which the fuel cell stack cell stacking direction is a vertical direction, it is possible to mount a high output fuel cell stack with a larger number of cell layers in an engine compartment.

As shown in FIG. 1, inside the engine compartment, the compressor 820 is placed below the fuel cell stack 100 and to the rear of the compressor 810. More specifically, the compressor 820 is rigidly attached to the compressor 810. The compressor 820 cools or heats the air to be supplied into the vehicle interior in which passengers or the like are by compressing or expanding the refrigerant.

The compressor 820 has a generally cylindrical external shape for which the diameter of the round end surface is smaller than that of the motor part 812 and the compression part 814. Also, the dimension R2 of the vertical direction of the compressor 820 is smaller than the dimension R1 of the vertical direction of the air compressor 810 (see FIG. 1). Typically, the output required for the compressor 820 for air conditioning within the interior is smaller than the output required for an air compressor to supply oxidation gas to the fuel cell stack 100. Because of this, the compressor for air conditioning within the interior is smaller than the air compressor for the fuel cell. The compressor 820 is attached to the fuel cell stack 100 with its cylinder axis perpendicular to the stacking direction Ds of the cells 130 of the fuel cell stack 100, and in an attitude in a direction parallel to the bottom surface of the fuel cell stack 100.

With this embodiment, the air compressor 810 with a large height direction dimension and the compressor 820 with a small height direction dimension are placed aligned in that order from the front to rear of the vehicle, below the fuel cell stack 100 placed at a tilt. Because of this, it is possible to effectively utilize the generally wedge shaped space under the fuel cell stack 100. To say this another way, it is possible to make the overall space occupied by the fuel cell stack 100 and the air compressors 810 and 820 smaller.

Also, with this embodiment, the vehicle interior is positioned even further to the rear of the structure shown in FIG. 1. With this embodiment, the compressors 810 and 820 are positioned at the opposite side of the fuel cell stack 100 to the vehicle interior. Because of this, the sound generated during driving by the compressors 810 and 820 does not easily enter the vehicle interior.

As shown in FIG. 1, the radiator 600 is attached at the front of the fuel cell stack 100 and the motor unit 200 within the engine compartment. The radiator 600 contains a first radiator 602, a second radiator 604, and a third radiator 606. The first radiator 602 is a structure for radiating into the air the heat of the cooling fluid flowing through the inside of the fuel cell stack 100. The second radiator 604 is a structure for radiating into the air the heat of the cooling fluid that cools the control circuit unit 400 and the inverter unit 830. The third radiator 606 is a structure for radiating into the air the heat of the cooling fluid for controlling the temperature of the vehicle interior in which a passenger such as the driver is.

The radiators 602, 604, and 606 are respectively equipped with complexly bent cooling fluid flow paths and a large number of heat radiation fins, and each has a plate shape overall. As shown in FIG. 1, in a direction perpendicular to the stacking direction Ds of the power generating cells 130, the radiator 602 exists in range Rr which is wider than range Rfc in which the second end plate 120 and the air compressor 810 exist. The radiators 604 and 606 are placed in front of and above the radiator 602. The radiator 604 is positioned above and to the rear of the radiator 606.

The plate shaped radiators 602, 604, and 606 are provided along the second end plate 120. As a result, the radiators 602, 604, and 606 are parallel to the second end plate 120 and the power generating cells 130. Specifically, the plate shaped radiators 602, 604, and 606 are placed facing tilted by θ in relation to the vertical direction U. Because of this, with this embodiment, compared to a mode for which the radiators are placed standing along the vertical direction U, the surface area is larger, and as a result, it is possible to place a radiator with larger external dimensions within an engine compartment having limited height. Specifically, it is possible to place a radiator with high cooling performance of the cooling fluid per unit of time within an engine compartment.

The hydrogen pump 610 is a pump for inflowing fuel gas exhausted from the fuel cell stack 100 into the fuel cell stack 100 again. The hydrogen pump 610 is fixed to the first end plate 110 as shown in FIG. 1.

With this embodiment, the hydrogen pump 610 is fixed to the first end plate 110 at the rear of the fuel cell stack 100. Because of this, when the vehicle collides with an obstacle in front or the like, even when the fuel cell system of FIG. 1 receives an impact from the front, that impact is received by the fuel cell stack 100 and the motor unit 200 fixed to the vehicle, and the possibility of the hydrogen pump 610 receiving that impact force is low. Thus, there is a low possibility of the hydrogen pump 610 being damaged and hydrogen gas flowing out to the exterior due to a vehicle collision or the like.

The cooling fluid pump 620 is a pump for circulating cooling fluid in the fuel cell stack 100 and the first radiator 602 of the radiator 600. The cooling fluid pump 620 is fixed to the first end plate 110 as shown in FIG. 1. The cooling fluid that circulates in the fuel cell stack 100 and the first radiator 602 may be charged in some cases.

With this embodiment, the cooling fluid pump 620 is fixed to the first end plate 110 at the rear of the fuel cell stack 100. Because of this, even in a case when the vehicle collides with an obstacle in front or the like and an impact is received from the front by the fuel cell system of FIG. 1, that impact is received by the fuel cell stack 100 and the motor unit 200 fixed to the vehicle, and there is a low possibility of the cooling fluid pump 620 receiving that impact force. Specifically, there is a low possibility of the cooling fluid pump 620 being damaged, and cooling fluid flowing out to the exterior. Thus, it is possible to reduce the possibility of the user reducing the voltage due to an outflow of cooling fluid.

The inverter unit 830 contains inverters for driving three-phase alternating current motors that respectively drive the hydrogen pump 610, the cooling fluid pump 620, and the air compressors 810 and 820. The inverter unit 830 is placed at a position further upward from the center at one side surface of the fuel cell stack 100 as shown in FIG. 1. This inverter unit 830 emits heat. Because of this, the inverter unit 830 is cooled by the cooling fluid circuit (not illustrated) connected to the second radiator 604.

The following kinds of effects can be obtained by placing the inverters that control each motor of the hydrogen pump 610, the cooling fluid pump 620, and the air compressors 810 and 820 which are peripheral devices to the fuel cell stack 100 consolidated in one location as with this embodiment. Specifically, it is possible to shorten the cooling fluid circuit (not illustrated) that connects those inverters and the second radiator 604. As a result, it is possible to make the overall size of the structure of FIG. 1 smaller, and to reduce the weight. Also, because it is possible to shorten the cooling fluid circuit, it is also possible to reduce the possibility of the cooling fluid leaking.

Also, with this embodiment, the inverter unit 830 that controls the motor of the hydrogen pump 610 and the cooling fluid pump 620 placed at the rear of the fuel cell stack 100 as well as the motors of the air compressors 810 and 820 placed under the fuel cell stack 100 is placed at the side surface of the fuel cell stack 100. Because of this, it is possible to shorten the electrical wiring ew that connects each motor and the second radiator 604. As a result, it is possible to make the size of the overall structure of FIG. 1 smaller, and to reduce the weight. It is also possible to reduce the possibility of the electrical wiring ew being disconnected because the electrical wiring ew is shorter.

B. Second Embodiment

With the second embodiment, the process of attaching the fuel cell to the vehicle is described with a focus on the step of stacking the end plates 110 and 120 and the plurality of power generating cells 130, as well as the step of attaching the air compressor 810 to the fuel cell stack 100.

Figure 4:
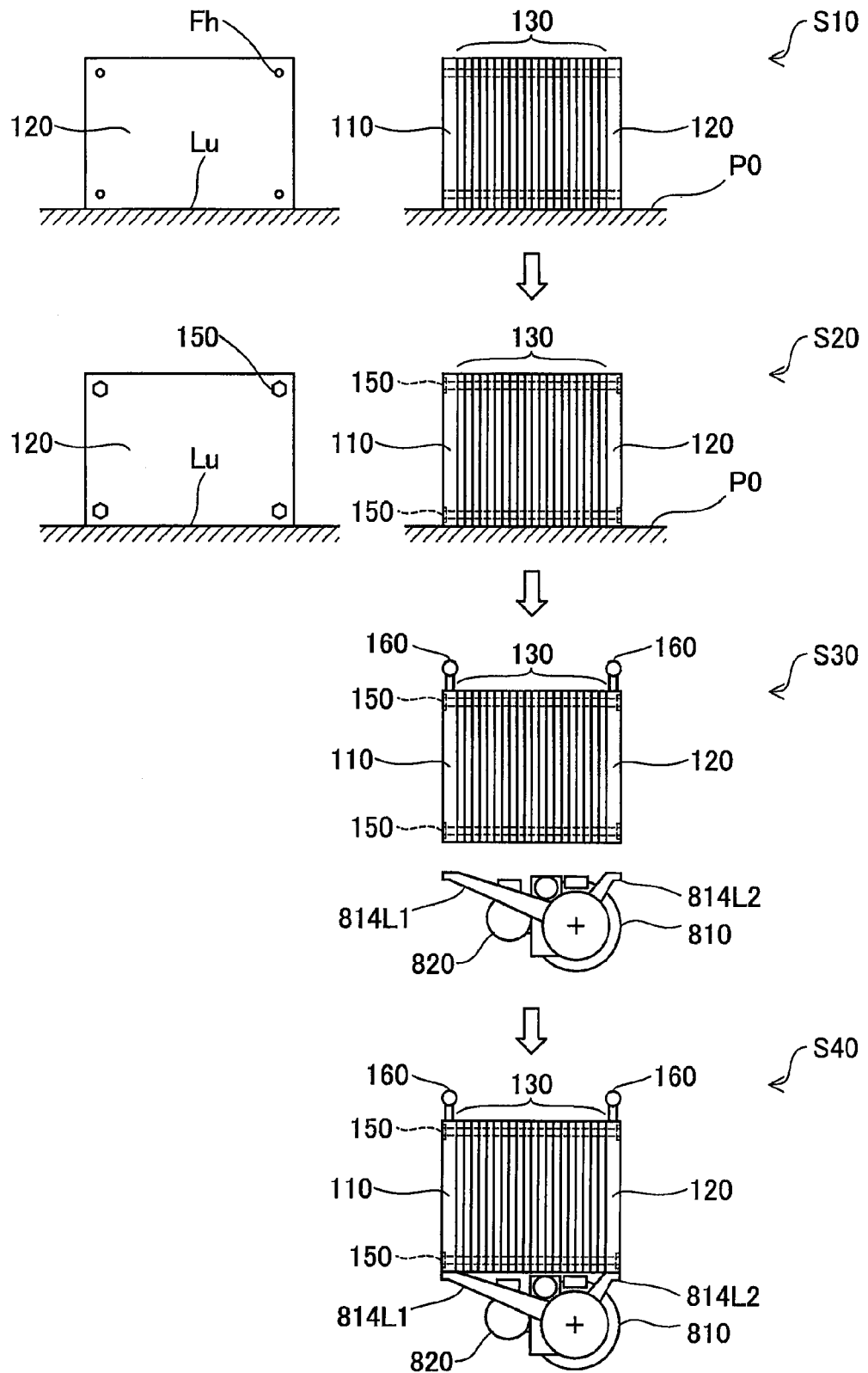
FIG. 4 is a drawing showing the method of stacking the end plates 110, 120 and the plurality of power generating cells 130, as well as the attachment method of the air compressor 810 to the fuel cell stack 100.

FIG. 4 is a drawing showing the method of stacking the end plates 110 and 120 and the plurality of power generating cells 130, as well as the method of attaching the air compressor 810 to the fuel cell stack 100. Note that for steps S10 and S20, to make the technology easy to understand, a side view and front view are shown. For steps S30 and S40, side views are shown.

At step S10, the first end plate 110, the plurality of power generating cells 130, and the second end plate 120 having a generally rectangular external shape are aligned in the order in which they are to be stacked, and placed on a plane P0. At that time, the first end plate 110, the plurality of power generating cells 130, and the second end plate 120 are placed on the plane P0 with, of the rectangular external shape, the side Lu to which the air compressor 810 is to be attached facing downward. Because of this, the bottom surface of the first end plate 110, the bottom surface of the plurality of power generating cells 130, and the bottom surface of the second end plate 120 are aligned flatly on the plane P0.

At step S20, the first end plate 110, the plurality of power generating cells 130, and the second end plate 120 are fastened by a fastening member 150. More specifically, four fastening members 150 are passed through four holes Fh provided near the four corners of the rectangles of the first end plate 110, the plurality of power generating cells 130, and the second end plate 120 having a generally rectangular shape, and both ends of the four fastening members 150 are fixed by bolts. As a result, the first end plate 110, the plurality of power generating cells 130, and the second end plate 120 are fixed to each other with the bottom surface of the first end plate 110, the bottom surface of the plurality of power generating cells 130, and the bottom surface of the second end plate 120 in a relative positional relationship defining the same plane. The first end plate 110, the plurality of power generating cells 130, and the second end plate 120 are an integral unit, and form a generally rectangular solid shaped fuel cell stack 100.

After that, a holder 160 is attached to the end surface of the top side of the first end plate 110 and the second end plate 120. The holder 160 is used later when attaching various structural elements to the fuel cell stack 100 or to suspend the fuel cell stack 100 when attaching the fuel cell stack 100 to the vehicle.

At step S30, the holder 160 is used to hoist the fuel cell stack 100 from the plane P0. Then, the air compressor 810 is attached to the bottom surface side of the first end plate 110 and the second end plate 120 (see FIG. 1 and FIG. 2). By performing the kind of processing like that in steps S10 to S30, it is possible to attach the air compressor 810 in a state with the bottom surface of the first end plate 110 and the bottom surface of the second end plate 120 aligned on a plane. Because of this, it is possible to make the attachment error of the air compressor 810 to the fuel cell stack 100 smaller.

As step S40, a fuel cell stack 100 to which the air compressor 810 is attached is shown. After this, the radiators 602, 604, and 606, the hydrogen pump 610, the cooling fluid pump 620 and the like are further attached to the fuel cell stack 100, and after that, at step S50, these are attached to the vehicle (see FIG. 1 and FIG. 3). Note that FIG. 3 shows a state for which step S50 is completed. Note that in FIG. 3, to make the technology easy to understand, an illustration of the radiators 602, 604, and 606, the hydrogen pump 610, the cooling fluid pump 620 and the like is omitted.

B. Variations:

Above, we described modes of carrying out the present invention, but the present invention is not limited to this kind of carrying out mode, and various modes can be carried out within a scope that does not stray from the main idea. The following kinds of variations are possible, for example.

B1. Variation 1:

With the aforementioned embodiments, the air compressor 810 and the end plates are fixed to each other by fixing the leg parts 812L, 814L1, and 814L2 of the air compressor 810 to each end plate using bolts. However, the compressor and the end plates can also be fixed using some other mode. For example, the compressor and the end plates can also be fixed via a third member other than the compressor and the end plates. Also, fixing can be done using another method such as adhesion or welding or the like rather than being fixed using bolts.

However, the fixing member for fixing the compressor and the end plates to each other preferably fixes the end plate and the first compressor without going via an elastic member such as packing or the like. By using this kind of mode, it is possible to reduce the possibility of separate oscillation of the end plate and the first compressor. Because of this, it is possible to place the end plate and the first compressor close together. Meanwhile, the waterproof property for the joint part of the end plate and the first compressor is ensured using the protruding portion described with the embodiment above even without using packing or the like.

B2. Variation 2:

With the first embodiment noted above, the protruding portion 144 is constituted in a mode protruding toward the leg parts 812L, 814L1, and 814L2 of the air compressor 810. However, the protruding portion placed around the hole at the waterproof cover can also use a mode for which it protrudes not at the air compressor side but rather at the fuel cell end plate side. With such a mode, the end part of the protruding portion is adhered to the end plate of the fuel cell. With this kind of mode as well, it is possible to establish both a rigid joining of the fuel cell end plate and air compressor as well as waterproofing.

Note that with the embodiments noted above, the waterproof cover was provided using resin having elasticity, but it is also possible to provide it using another material. However, the protruding portion is preferably provided using a material that has elasticity.

B3. Variation 3:

With the embodiments noted above, the external shape of the power generating cells 130, the first end plate 110, and the second end plate 120 when projected in the stacking direction Ds is generally rectangular. However, the external shape of the power generating cells 130, the first end plate 110, and the second end plate 120 can also be another shape. However, the external shape of the first end plate and the second end plate preferably respectively contain one straight line side such that they can be aligned and placed on a flat plane.

Note that the external shape of at least one of the first end plate and the second end plate can also include two or more straight line sides. Even with such a mode, at least one of those two or more straight line sides is put at the bottom, and the end plate is placed on the plane to constitute the fuel cell stack, and it is possible to attach the compressor to the straight line side that contacted that plane. By constituting a fuel cell stack using such a method and fixing to the compressor, it is possible to firmly fix the fuel cell stack and the compressor with little error.

Also, with the embodiments noted above, the first end plate 110, the plurality of power generating cells 130, and the second end plate 120 are all placed on the same plane P0 (see FIG. 4, S10 and S20). However, when the plurality of power generating cells 130 are aligned together with the first end plate 110 and the second end plate 120 in the stacking sequence, the first end plate 110 and the second end plate 120 can also not be placed on the same plane. Also, when aligning in the stacking sequence, it is also possible to have the first end plate 110 and the second end plate 120 not placed on continuous same planes. Specifically, it is also possible to place the first end plate 110 and the second end plate 120 on non-continuous separate planes. However, it is preferable that the plane on which the first end plate 110 and the plane on which the second end plate 120 is placed be a plane included in the same virtual plane.

B. Variation 4:

With the second embodiment, among the steps for attaching the fuel cell to the vehicle, our description focused on the step of stacking the end plates 110 and 120 and the plurality of power generating cells 130, as well as the step of attaching the air compressor 810 to the fuel cell stack 100. Among those steps, the step of respectively attaching the radiators 602, 604, and 606, and hydrogen pump 610 and cooling fluid pump 620 and the like can be before or can be after any step among steps S10 to S50. It is also possible to consolidate one or more structural elements for attachment, and possible to attach with different timing.

B6. Variation 5:

Above, we gave a detailed description while referring to preferred exemplary embodiments of the invention of this application. However, the invention of this application is not limited to the embodiments and constitutions described above. Also, the invention of this application includes various variations and equivalent constitutions. Furthermore, for the various elements of the disclosed invention, various combinations and constitutions were disclosed, but those are exemplary items, and there can be more of, or less of each element. There can also be just one element. Those modes are included within the scope of the invention of this application.

The invention claimed is:

1. A structure for mounting a fuel cell in a vehicle, comprising
    a fuel cell stack having a plurality of stacked cells, and a first and second end plate placed at both ends in stacking direction of the plurality of cells,
    a first compressor for supplying oxidation gas to the fuel cell stack,
    a second compressor for adjusting a temperature in a passenger cabin of the vehicle, wherein a vertical dimension of the second compressor is smaller than that of the first compressor, and
    a flat plate shaped heat radiator for cooling a cooling medium that circulates inside the fuel cell stack, wherein
    the fuel cell stack is provided in an attitude in which the stacking direction of the plurality of cells is tilted relative to a front-back direction of the vehicle, and the second end plate is provided at forward and upper position relative to the first end plate in the vehicle,
    the heat radiator is provided at a forward position relative to the second end plate and along the second end plate in the vehicle, and
    the first compressor is fixed at three or more points in total to the first and second end plates below the fuel cell stack, and fixed at least at one point of the at least three points to the first end plate and at another point of the at least three points to the second end plate;
    wherein both the first compressor and second compressor are located directly below the fuel cell stack and on a side of the fuel cell stack that is opposite the passenger cabin of the vehicle;
    wherein the second compressor is located behind the first compressor.

2. A structure for mounting a fuel cell in a vehicle, comprising
    a fuel cell stack having a plurality of stacked cells, and a first and second end plate placed at both ends in stacking direction of the plurality of cells,
    a first compressor for supplying oxidation gas to the fuel cell stack, and
    a flat plate shaped heat radiator for cooling a cooling medium that circulates inside the fuel cell stack, wherein
    the fuel cell stack is provided in an attitude in which the stacking direction of the plurality of cells is tilted relative to a front-back direction of the vehicle, and the second end plate is provided at forward and upper position relative to the first end plate in the vehicle,
    the heat radiator is provided at a forward position relative to the second end plate and along the second end plate in the vehicle,
    the first compressor is fixed at three or more points in total to the first and second end plates below the fuel cell stack, and
    a waterproof case for covering at least one of the first and second end plates, wherein
    the waterproof case comprises:
        a hole in which a fixing member passes through, the fixing member fixing mutually the first compressor and the end plate covered by the waterproof case, and
        a protruding portion that surrounds the hole, has elasticity, and protrudes to a side of the end plate covered by the waterproof case or a side of the first compressor, wherein
    in a state in which the end plate covered by the waterproof case and the first compressor are fixed by the fixing member, a tip of the protruding portion is in contact with the end plate or the first compressor.

3. A method of mounting a fuel cell in a vehicle, comprising
    (a) preparing a fuel cell stack having a plurality of stacked cells and a first and second end plate placed at both ends in stacking direction of the plurality of cells,
    a first compressor for supplying oxidation gas to the fuel cell stack, and
    a flat plane shaped heat radiator for cooling a cooling medium that circulates inside the fuel cell stack, and
    (b) attaching the fuel cell stack, the first compressor, and the heat radiator to the vehicle such that
    the fuel cell stack is provided in an attitude in which the stacking direction of the plurality of cells is tilted relative to a front-back direction of the vehicle, and the second end plate is provided at forward and upper position relative to the first end plate in the vehicle,
    the heat radiator is provided at a forward position relative to the second end plate and along the second end plate in the vehicle, and
    the first compressor is fixed at three or more points in total to the first and second end plates below the fuel cell stack, wherein
    the step (a) comprises:
        preparing the first and second end plates respectively having one straight line side in at least a portion,
        aligning the plurality of cells and the first and second end plates in a stacking sequence, while placing the first and second end plates on a same plane in an orientation in which each of the one sides of the first and second end plates is at a bottom, and
        joining the plurality of cells and the first and second end plates to constitute the fuel cell stack, and
    the step (b) comprises
        supporting the fuel cell stack at a different side from the one side of the first and second end plates, and
        fixing the first compressor to the first and second end plates so as to be in contact with each of the one sides of the first and second end plates.

* * * * *

UNITED STATES PATENT AND TRADEMARK OFFICE
CERTIFICATE OF CORRECTION

PATENT NO.       : 8,371,406 B2
APPLICATION NO.  : 13/144069
DATED            : February 12, 2013
INVENTOR(S)      : Masaki et al.

It is certified that error appears in the above-identified patent and that said Letters Patent is hereby corrected as shown below:

In the Specification

Column 3, line 18:
Delete "4. A method" and insert therefor --A method--;

Column 10, lines 28-29:
Delete "second radiator 604" and insert therefor --inverter unit 830--.

Signed and Sealed this
Third Day of September, 2013

Teresa Stanek Rea
*Acting Director of the United States Patent and Trademark Office*